United States Patent [19]

Dahl

[11] Patent Number: 4,692,631
[45] Date of Patent: Sep. 8, 1987

[54] TURBINE ALTERNATOR WITH A CENTRAL CLEAR OPTICAL PATH

[75] Inventor: Randy L. Dahl, Scottsdale, Ariz.

[73] Assignee: Motorola, Inc., Schaumburg, Ill.

[21] Appl. No.: 892,552

[22] Filed: Aug. 4, 1986

[51] Int. Cl.⁴ ................. F01D 15/10; H02K 21/12; H02P 9/04

[52] U.S. Cl. ........................... 290/55; 290/44; 310/156; 416/178; 416/187; 416/186 A; 415/4

[58] Field of Search ................. 290/55, 44, 43, 54, 290/52; 416/178, 187, 186 A; 310/156, 62, 63; 415/4 A, 4 R

[56] References Cited

U.S. PATENT DOCUMENTS

| | | | |
|---|---|---|---|
| 1,433,995 | 10/1922 | Fowle | 416/186 A |
| 1,939,317 | 12/1933 | Pope | 415/4 A |
| 2,766,964 | 10/1956 | Almquist et al. | 416/186 A |
| 3,076,510 | 2/1963 | Piel | 415/4 A |
| 3,772,992 | 11/1973 | Moore et al. | 310/156 X |
| 3,856,432 | 12/1974 | Campagnuolo et al. | 416/186 A |
| 3,938,907 | 2/1976 | Magoveny et al. | 415/4 R X |
| 4,069,673 | 1/1978 | Lapeyre | 290/52 |
| 4,318,019 | 3/1982 | Teasley et al. | 310/156 |
| 4,403,161 | 9/1983 | Miyashita et al. | 310/156 |
| 4,477,040 | 10/1984 | Karanik | 290/55 X |
| 4,506,181 | 3/1985 | Jones et al. | 310/156 |
| 4,577,116 | 3/1986 | Pinson | 310/156 X |

FOREIGN PATENT DOCUMENTS 576980   8/1924   France ........................... 415/4 R Primary Examiner—William M. Shoop, Jr.
Assistant Examiner—Sharon D. Logan
Attorney, Agent, or Firm—Harry A. Wolin; Eugene A. Parsons

[57] ABSTRACT

A turbine alternator comprising a central clear optical path through which certain objects or optics may pass unimpeded. This design features a means for internal safe arming of the munition in which the turbine alternator is contained. In addition, this turbine alternator features a rotating stator and stationary windings.

7 Claims, 4 Drawing Figures

TURBINE ALTERNATOR WITH A CENTRAL CLEAR OPTICAL PATH

BACKGROUND OF THE INVENTION

This invention generally pertains to a turbine alternator with a central clear optical path. Generally, many devices requiring a central clear path also require a power supply to send an initial signal so that its operation can be initiated. Commonly, the power supply is a turbine alternator which is wind flow powered.

When a projectile or the like is launched, it is subjected to an enormous wind flow. In a wind powered turbine, the turbine is subjected to the wind flow which causes the turbine to rotate allowing an initial signal to be sent. Air flow powered turbines are inherently safe in that the turbine will not rotate causing a signal to be sent unless it is subjected to wind flow. Therefore, the air flow powered turbine acts as a safe arm device in that it will not activate unless subjected to the wind flow of a launch.

SUMMARY OF THE INVENTION

The present invention pertains to a turbine alternator comprising a geometric design which provides for a central clear optical path. The turbine alternator provides a power supply so that an initial signal can be sent. The design of the turbine alternator includes a central clear optical path through which an object can readily pass or wherein optics can be positioned. The turbine alternator is inherently safe in that it must be subjected to a substantial wind flow in order to rotate the turbine.

The turbine alternator with a central clear optical path comprises a hollow cylindrical center tube to which an upper system of ring bearings is fixed. The center tube includes a system of air flow windows. A hollow cylindrical assembly of turbine blades is rotatably mounted so as to rotate about the center tube on upper and lower systems of ring bearings. The assembly of turbine blades is mounted directly over the system of air flow windows. Magnets are attached on the outside lower portion of the assembly of turbine blades so as to function as a stator. A combination of internal and external wire windings are attached to the inside of a housing about the magnets. This design is unique in that the stator rotates while the windings remain stationary.

The lower portion of the center tube is surrounded by the housing. Also, the lower portion of the center tube must be baffled or sealed so that all air flow must exit through the air flow windows into the assembly of turbine blades. The means of sealing or baffling must be negligible as to the objects passing through the central clear optical path. As the air flow passes through the air flow windows rotating the assembly of turbine blades, the stator introduces current into the windings resulting in the output of the desired signal.

It is an object of the present invention to provide a new and improved design for a turbine alternator comprising a central clear optical path.

It is a further object of the present invention to provide a turbine alternator including a rotating stator and stationary windings.

It is a further object of the present invention to provide a turbine alternator with an internal means for safe arming the munition.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
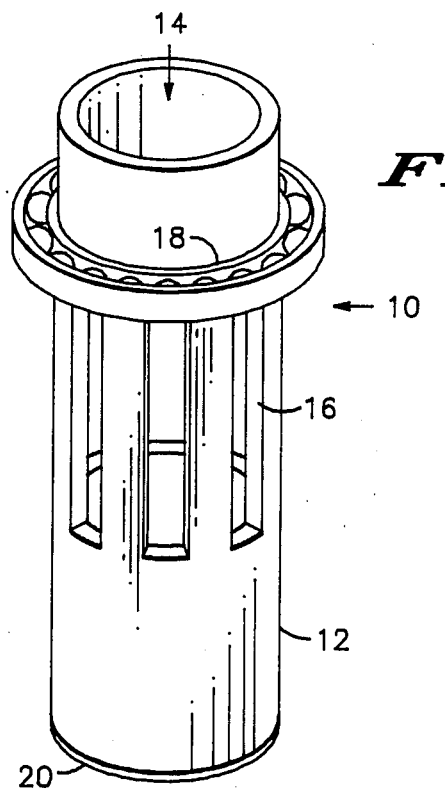
FIG. 1 is a view in perspective of a hollow cylindrical center tube showing the various assemblies attached to it.

Referring specifically to FIG. 1, a center tube assembly, designated 10 is illustrated in perspective. Center tube assembly 10 comprises a hollow cylindrical center tube 12 which is designed so as to allow a central clear optical path 14. Center tube 12 includes air flow windows 16 through which air passes out of center tube 12. Air flow windows 16 are positioned directly below an upper outer ring bearing race 18 which is affixed coaxially to center tube 12. The lower portion of center tube 12 is sealed by a seal, 20, across central clear optical path 14. This is so all air flow must exit through air flow windows 16. Seal 20 is negligible as to obstructing central clear optical path 14.

Figure 2:
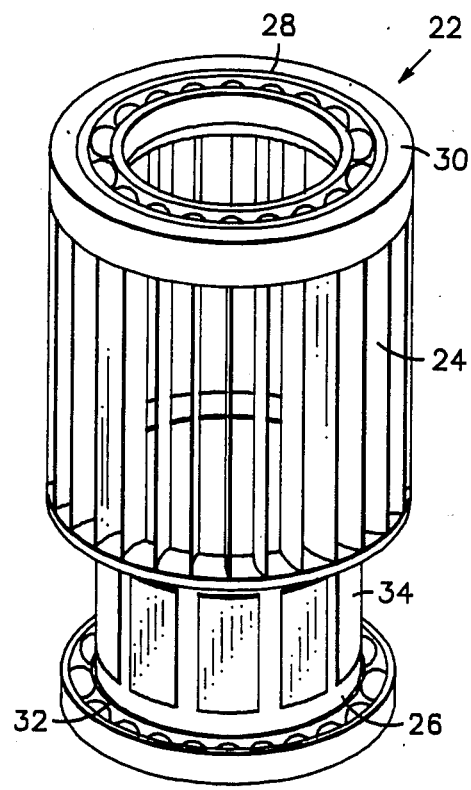
FIG. 2 is a view in perspective of a hollow cylindrical assembly of turbine blades, portions thereof broken away.

Referring specifically to FIG. 2 a view in perspective of a hollow cylindrical assembly, 22, of turbine blades is shown. Turbine blades 24 comprise the upper portion of assembly 22 while a lower cylinder 26 comprises the lower portion of assembly 22. An upper inner ring bearing race 28 is shown at the upper end of assembly 22 affixed to the inner portion of an upper turbine blade connector ring 30. A lower outer ring bearing race 32 is affixed coaxially to the outside of lower cylinder 26. Above lower outer ring bearing race 32, the magnets, 34, are attached to the periphery of lower cylinder 26 of assembly 22.

Figure 3:
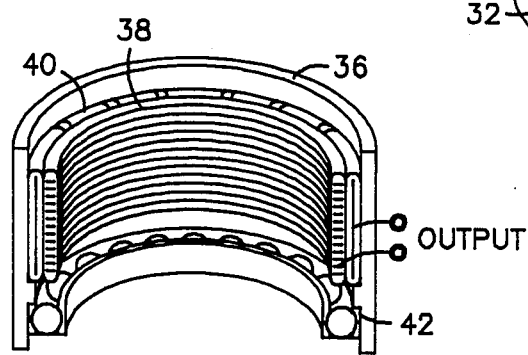
FIG. 3 is a view in perspective of a housing which has been cut away to show its interior.

FIG. 3 is a view in perspective of a housing, 36, wherein portions have been cut away to show the interior of housing 36. Internal wire windings, 38, and external wire windings 40 are fixed coaxially to the inner wall of housing 36. Housing 36 remans stationary with respect to hollow cylindrical assembly 22 in FIG. 2. Also fixed coaxially to the inner wall of housing 36 is a lower inner ring bearing race, 42. Internal wire windings 38, external wire windings 40 and lower inner ring bear race 42 are all fixed along the total circumference of the inner wall of housing 38.

Figure 4:
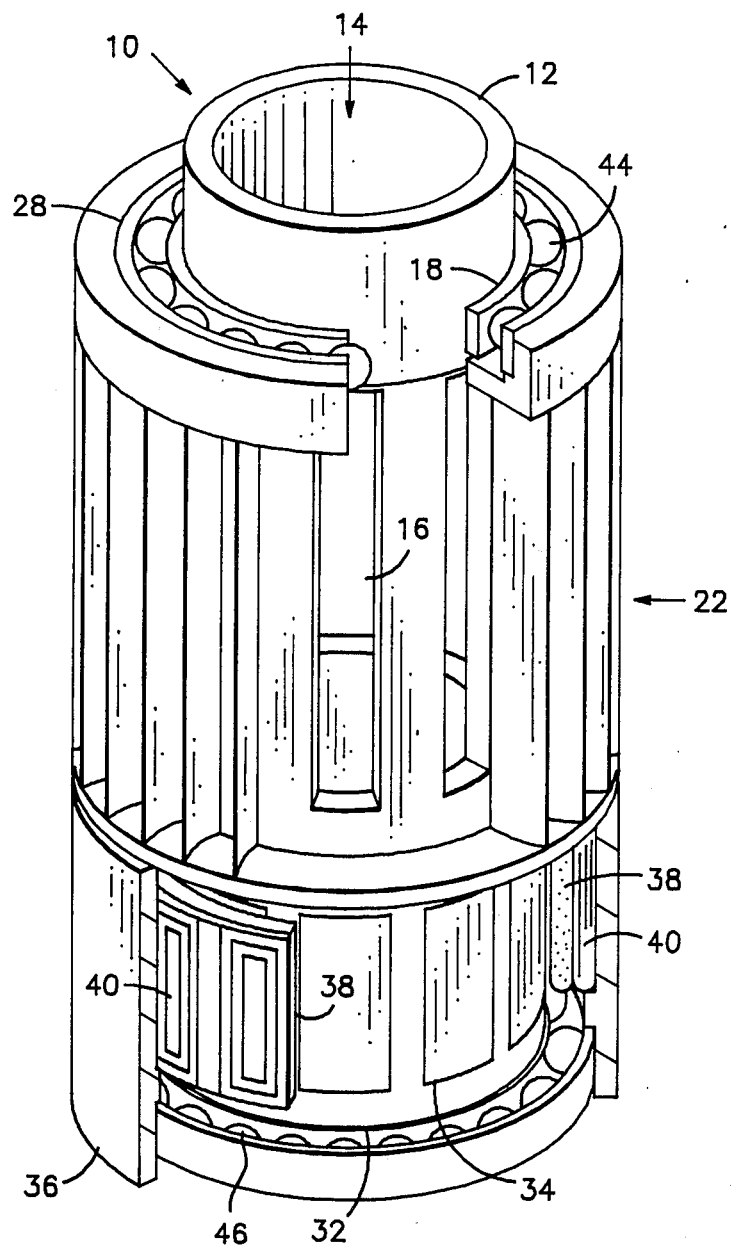
FIG. 4 is a view in perspective of a fully assembled turbine alternator embodying the present invention, portions thereof broken away and shown in section.

Referring specifically to FIG. 4, an assembled turbine alternator with a central clear optical path is shown in perspective with portions broken away so that its inner components might be shown. Center tube 12 is shown surrounding central clear optical path 14. Upper outer ring bearing race 18 is affixed coaxially to center tube 12 and upper inner ring bearing race 28 affixed to assembly 22 is matingly disposed to upper outer ring bearing race 18 about bearings 44. Lower outer ring bearing race 32 is fixed coaxially to assembly 22 and is matingly disposed to lower inner ring bearing race 42 which is coaxially affixed to the inside of housing 36 about lower bearings 46. Assembly 22 is positioned relative to center tube assembly 10 so that air flow windows 16 are directly beneath turbine blades 24 so that all air flow exiting through air flow window 16 is introduced into turbine blades 24. As this air flow causes assembly 22 to rotate about center tube assembly 10, magnets 34 induce current into internal wire windings 38 and external wire windings 40 which are fixed to the inner wall of housing 36 resulting in the desired power or signal. The lower portions of center tube assembly 10 and assembly 22 are surrounded and protected by housing 36.

This description has shown a new and improved turbine alternator comprising a central clear optical path. Because of its turbine design, this turbine alternator has an internal means for safe arming the munitions in which it is contained. Further, this new and improved turbine alternator comprises a rotating stator while its wire windings remain stationary. Thus, while we have shown and described specific embodiments of this invention, further modification and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. A turbine alternator with a central clear optical path comprising:
    a hollow, cylindrical center tube defining said central clear optical path;
    a hollow, cylindrical assembly of turbine blades including a lower cylinder rotatably mounted on said center tube;
    at least one magnet mounted on the periphery of said lower cylinder of said assembly of turbine blades; and
    wire windings fixedly positioned about said magnets.

2. The turbine alternator of claim 1 including the hollow, cylindrical center tube having means for inducting total air flow into the rotatably mounted, hollow, cylindrical assembly of turbine blades.

3. The turbine alternator of claim 2 wherein magnets are fixed coaxially to the outer periphery of the rotatably mounted, hollow, cylindrical assembly of turbine blades so as to introduce a current into the windings.

4. The turbine alternator of claim 3 wherein the fixed magnets function as a stator and rotate while the windings are motionless.

5. A turbine alternator with a central clear optical path comprising:
    a hollow, cylindrical center tube having a lower portion including air flow windows, said center tube defining said central clear optical path;
    means for sealing or baffling said lower portion of said hollow, cylindrical center tube;
    a hollow, cylindrical assembly of trubine blades rotatably mounted on said center tube by a system of ring bearings;
    rotating stator means fixed to said assembly of turbine blades; and
    wire windings fixedly positioned about said rotating stator means.

6. The turbine alternator of claim 5 including a means for relaying a signal created in the wire windings.

7. The turbine alternator of claim 6 wherein all air must exit through the rotatably mounted, hollow, cylindrical assembly of turbine blades.

* * * * *